United States Patent [19]

Torch

[11] 4,133,226
[45] Jan. 9, 1979

[54] SAW BIT SWAGE
[76] Inventor: Joseph Torch, 45 Clark Ave., Carbondale, Pa. 18407
[21] Appl. No.: 821,509
[22] Filed: Aug. 3, 1977
[51] Int. Cl.² .............................................. B23D 63/06
[52] U.S. Cl. ..................................................... 76/56
[58] Field of Search .................. 76/51, 53, 56; 72/476
[56] References Cited
U.S. PATENT DOCUMENTS

| 84,361 | 11/1868 | Kirk | 76/56 |
|---|---|---|---|
| 141,572 | 8/1873 | McCollum et al. | 76/56 |
| 301,343 | 7/1884 | Dinning | 76/56 |
| 309,534 | 12/1884 | Emerson | 76/56 |

Primary Examiner—Nicholas P. Godici
Assistant Examiner—Roscoe V. Parker
Attorney, Agent, or Firm—Spencer & Kaye

[57] ABSTRACT

A tool for rapidly and accurately swaging the individual teeth, or bits, of a large power-driven saw, with the teeth remaining in place on the saw blade or band, the tool being composed of a plurality of hardened steel parts presenting a recess for receiving a tooth to be swaged and defining the desired final shape of the tooth tip, and a guide element arranged to engage a portion of the saw blade adjacent the tooth being swaged in a manner to maintain the tool in the orientation relative to the tooth required to effectuate optimum swaging. The tool is constructed to be driven by a power tool, such as an air hammer.

8 Claims, 9 Drawing Figures

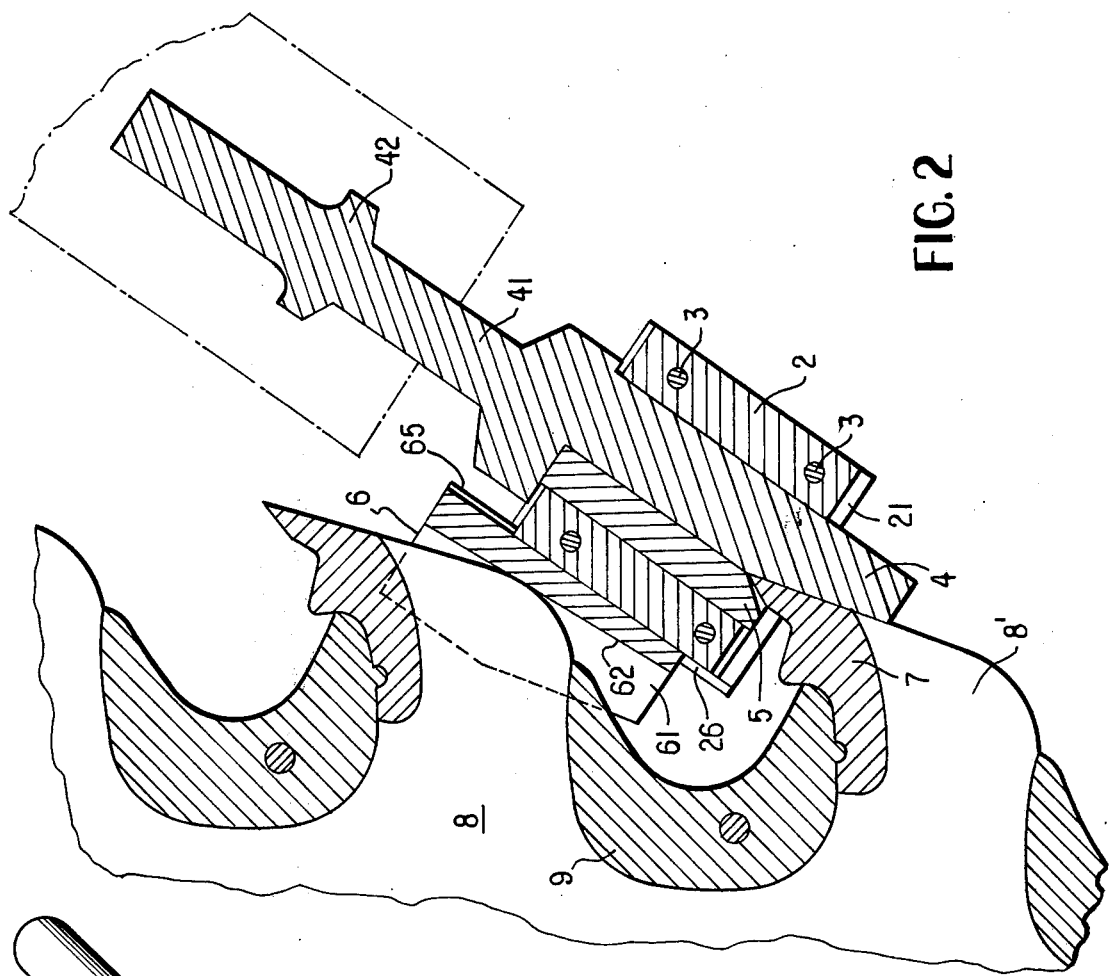
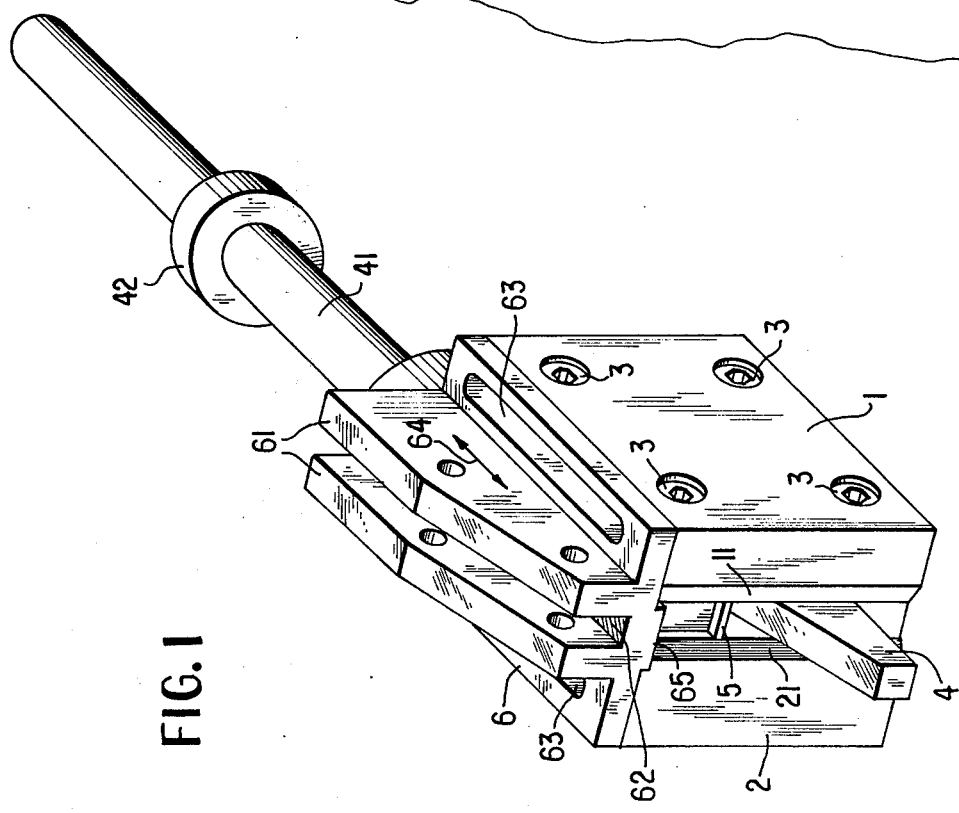

SAW BIT SWAGE

BACKGROUND OF THE INVENTION

The present invention relates to a swaging tool for the teeth, or bits, of large saw blades, and is applicable to inserted-tooth saws and solid-tooth saws. The invention is particularly applicable to wood cutting saws.

During industrial utilization of sawing machines, particularly those employing large saw blades, it is necessary to periodically restore the cutting edges of the teeth in order to maintain proper cutting efficiency. In saw mills, for example, where such blades are in practically continuous use, this procedure might have to be carried out several times during a work shift.

Commonly, the teeth of such saw blades or bands are restored by a procedure involving swaging which is done manually followed by filing, manually or with a power grinder. Swaging is effectuated by positioning a swaging tool around each tooth in turn and striking the rear end of the tool with a hammer. The tool presents one or two recesses which define the desired final shape of the major tooth surfaces. The tool is formed so that the, or each, recess is substantially wider than the tooth and must be carefully positioned to treat each side of the tooth individually.

Because such a tool can restore a saw tooth to only an approximation of its original shape, it is generally necessary to follow the swaging operation with a hand filing or power grinding of each blade tooth.

Large saw blades of the type here under consideration contain a large number of teeth and the above-described reshaping operations are relatively time consuming. For example, swaging and filing of a 56 inch diameter circular saw blade which will have of the order of 55 teeth generally takes 30 to 45 minutes, so that the performance of two complete reshaping procedures during the course of a work shift results in a significant down time.

Moreover, hand swaging operations must be performed with a high degree of skill and care since the tool must be perfectly oriented relative to the blade tooth at the instant of each hammer blow. Any tilting of the swaging tool away from proper orientation will result in the production of incorrect bevel or edge angles.

SUMMARY OF THE INVENTION

It is an object of the present invention to overcome the above-noted drawbacks possessed by prior art swaging tools.

Another object of the invention is to reduce the amount of skill required to correctly reshape the teeth of such saw blades.

A further object of the invention is to substantially reduce the time required to perform such a reshaping procedure.

These and other objects are achieved according to the invention by the provision of a tool for swaging saw teeth, composed of means defining a recess for receiving the tip of a saw tooth and shaped to the desired final configuration of that tooth, which means are made of a hardened material, tool guide means adjustable in position, and fixable in any selected position, relative to the recess-defining means and arranged to cooperate with a portion of the associated saw for establishing a selected orientation between the recess-defining means and the tooth to be swaged; and impact force delivery means rigidly connected to the recess-defining means for delivering to the recess-defining means impact forces in the direction toward a tooth inserted in the recess.

BRIEF DESCRIPTION OF THE DRAWINGS

FIG. 1 is a perspective view of a preferred embodiment of a swaging tool according to the invention.

FIG. 2 is a longitudinal, cross-sectional view of the swaging tool of FIG. 1 in position for swaging a tooth of an inserted-tooth circular saw.

DESCRIPTION OF THE PREFERRED EMBODIMENTS

Figure 3A:
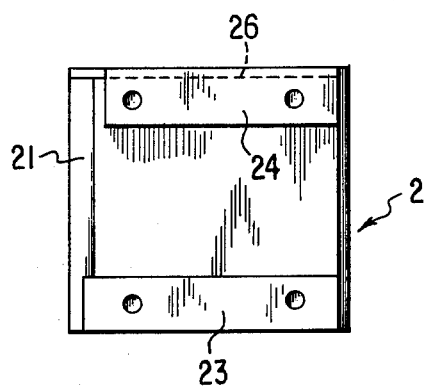
FIGS. 3a, 3b and 3c are side elevational, top plan and front elevational views, respectively, of one component of the tool shown in FIG. 1.

The preferred embodiment of a novel swaging tool according to the invention is, as shown in FIG. 1, composed of two hammer holder members 1 and 2 secured together by machine screws 3, which may be cap screws. Holders 1 and 2 are formed to define a longitudinal passage in which are disposed a bottom hammer 4 and a top hammer 5. The surfaces of hammers 4 and 5 which face one another are inclined, as is shown in FIG. 1 for bottom hammer 4 and in FIG. 2 for both hammers, to slope toward one another in the direction away from the front end of the tool and to meet at the ends of their sloping portions. In addition, holders 1 and 2 present interior wall portions bordering the sides of the space between the inclined surfaces of hammers 4 and 5. The wall portion of holder 2 is visible in FIG. 1. Thus the inclined surfaces of hammers 4 and 5 and the above-mentioned interior wall portions of holders 1 and 2 together form a recess defining the desired final shape of the teeth of a saw blade. The width of this recess, measured between the interior wall portions of holders 1 and 2, is equal, with a small clearance, to the desired final width of the cutting edge of each tooth to be swaged.

Hammers 4 and 5 each have a rectangular cross section.

The assembly formed by elements 1, 2, 4 and 5 is surmounted by a tool angle adjustment member 6 provided with longitudinally extending, upstanding flanges 61 defining, together with a sloping bottom surface 62 extending between the flanges, a guide channel for maintaining the tool in position during a swaging operation.

Bottom hammer 4 is extended from the rear of the assembly by a rod 41 of circular cross section provided with an integral collar 42 for attachment to a drive tool, such as an air hammer.

Adjustment member 6 is secured to holders 1 and 2 by machine screws, for example cap screws (not shown), each extending through a respective elongated longitudinal slot 63 and threaded into a respective one of a series of threaded bores formed in an associated one of holders 1 and 2. With this arrangement, the position of adjustment member 6 with respect to the remainder of the assembly can be adjusted in the direction of the double arrows 64.

Each of components 1, 2, 4 and 5 can be made of a suitable heat treated tool steel, while adjustment member 6 can be made of a suitable heat treated stainless steel.

Holders 1 and 2 are provided with respective chamfers, 11 and 21 adjacent the opening into the tooth-receiving recess in order to facilitate entry of a saw blade tooth into the recess.

The manner in which the tool shown in FIG. 1 is employed to swage a saw blade tooth is illustrated in the cross-sectional view of FIG. 2, where the tool is being applied to one tooth 7 of an inserted-tooth saw blade 8 of relatively large diameter. Cross-hatching is omitted from the body of the blade itself to avoid confusion.

In the standard construction of such saw blades, each tooth 7 is held in place in a respective recess of the saw blade 8 by a holder 9 and each tooth 7 is backed by a projecting portion 8' of the saw blade itself. The cutting surfaces of each saw tooth 7 are intended to form a specified angle and the outer surface of each tooth is commonly parallel to the outer surface of its associated backing portion 8'.

In accordance with the present invention, the tool holder is first mounted in an air hammer, the attachment portion of which is illustrated in broken lines in FIG. 2, and then positioned relative to a saw blade tooth 7 in a manner such that the tip of the tooth is seated in the recess formed between the sloping surfaces of hammers 4 and 5 and the associated interior wall portions of holders 1 and 2. Bottom surface 62 of adjustment member 6 is inclined relative to the adjustment direction 64 of the member to permit adjustment of the orientation of the tool relative to the tooth being processed.

The cap screws extending through slots 63 are initially loosened, and the tool is positioned in the manner shown in FIG. 2 with the channel formed between flanges 61 surrounding the backing portion associated with the saw blade tooth just preceding the tooth to be swaged. Inclined surface 62 is placed against the outer periphery of that backing portion. Then, the adjustment member 6 is moved by the operator in the adjustment direction 64 while surface 62 remains in contact with the outer surface of its associated blade backing portion until the sloping surface of bottom hammer 4 comes to lie flush against the associated surface of tooth 7 and a portion of the adjacent outer surface of backing portion 8'. The tool is now oriented properly relative to the tooth to be swaged and the cap screws extending through slots 63 are tightened down to rigidly secure adjustment member 6 to holders 1 and 2.

This operation also establishes proper adjustment of the tool for all of the other teeth of the same or an identical saw blade.

The spacing between flanges 61 is selected to be only slightly greater than the thickness of the saw blade so that engagement of the flanges around the backing portion with which they are associated also assures that the swaging tool cannot be inadvertently tilted in directions perpendicular to the plane of FIG. 2. The engagement of a portion of the saw blade in the channel between the flanges 61 also serves to prevent any undesirable twisting, or canting, of the tool about its longitudinal axis during swaging.

Once the tool has been adjusted to the particular saw blade and is held in position with surface 62 bearing firmly against its associated portion of the saw blade, the air hammer, or other drive device, can be placed in operation to cause the swaging tool to apply forceful impact strokes to the tip of tooth 7. As a result, the requisite swaging operation is completed in a very short time.

Because the tool is accurately and positively positioned relative to the blade tooth, it becomes possible to use a power tool to produce the necessary swaging impact. Not only does the swaging operation proceed rapidly, but it has also been found, probably due to the high impact levels which can be produced by a power tool, that the original shape of the saw tooth tip will be substantially restored by the swaging operation itself, so that the need for a subsequent filing step in connection with each swaging procedure can be eliminated. In practice, it is found that the teeth of a saw blade can be properly maintained if the filing step is performed only after every two or three swaging procedures.

In comparison with prior art procedures, it has been found that the swaging tool according to the invention permits a complete swaging procedure to be performed on a 56 inch diameter, inserted-tooth saw blade having approximately 55 teeth in 7 to 10 minutes by personnel having only a small amount of experience.

Surface 62 is easily held against the associated outer surface of the saw blade in view of the very small amplitude of movement of the tool during the swaging operation.

If, for special purposes, it were desired to orient the swaging tool so that some angle exists between the outer surface of the tooth and the sloping surface of bottom hammer 4, the necessary adjustment could be achieved simply by providing a threaded bore through bottom hammer 4, near the free end thereof, the axis of which hole is parallel to the plane of FIG. 2, and by inserting a set screw into that threaded hole so that the inner end of the screw bears against the outer surface of the saw blade. The screw could then be adjusted to establish a desired spacing between the sloping surface of hammer 4, in the region of the end thereof, and the outer surface of tooth 7 and its associated backing portion 8'. Once the position of adjustment member 6 has been established in the manner described above, the swaging operation could proceed.

Figure 3B:
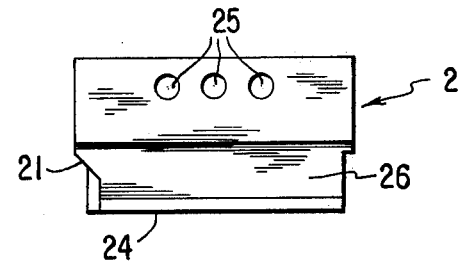
Figure 3C:
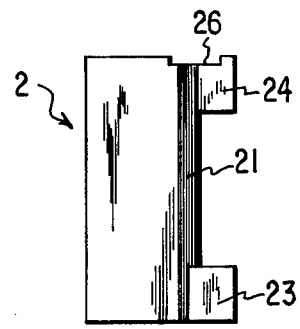

The precise form of holder 2 is illustrated in the three views of FIGS. 3a, 3b and 3c. This holder is formed to have a main body 22 and laterally projecting portions 23 and 24 which define the generally rectangular passage in which hammers 4 and 5 are held in the manner generally shown in FIG. 2. FIG. 3a illustrates four threaded blind bores provided in portions 23 and 24 to receive the machine screws 3. FIG. 3b illustrates three threaded blind bores 25 any one of which can receive the holding screw inserted through a respective one of slots 63 of adjustment member 6 in order to secure the adjustment member to holder 2. The holder 2 is formed, at its top surface, with a longitudinal channel 26 of generally rectangular cross section for guiding a correspondingly shaped rib 65 formed in the bottom surface of adjustment member 6, as is shown in FIG. 5a.

The length of holder 2, i.e. the horizontal dimension in FIG. 3a between its rear edge and the inner edge of chamfer 21, is generally equal to the overall length of top hammer 5, although this is not essential.

Figure 4A:
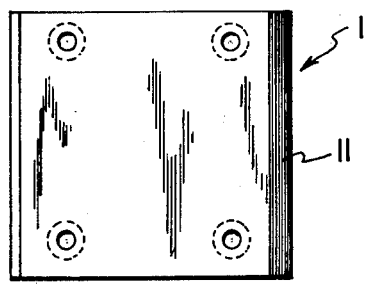
FIGS. 4a and 4b are side elevational and top plan views, respectively, of a second element of the tool shown in FIG. 1.
Figure 4B:
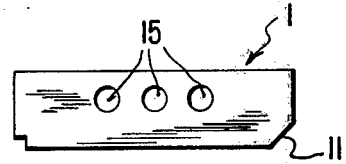

The form of holder 1 is shown in the two views of FIGS. 4a and 4b. As shown in FIG. 4a, this holder is provided with through bores for receiving machine screws 3, and these bores may be countersunk at the side remote from the plane of FIG. 4a. As is shown in FIG. 4b, holder 1 is also provided with three threaded blind bores 15 any one of which can receive the machine screw inserted through the associated slot 63 of adjustment member 6. The longitudinal dimension of holder 1, i.e. the horizontal dimension in FIGS. 4a and 4b, is equal to that of holder 2.

Figure 5A:
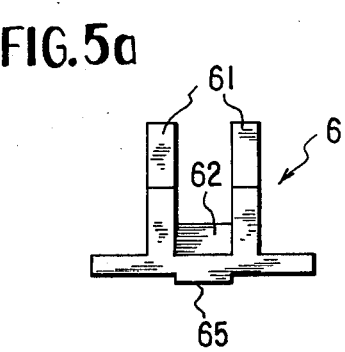
FIGS. 5a and 5b are front elevational and top plan views, respectively, of a third component of the assembly shown in FIG. 1.
Figure 5B:
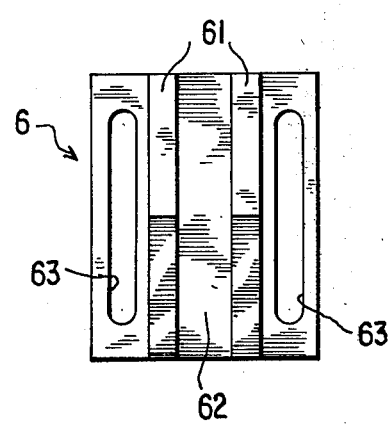

FIGS. 5a and 5b illustrate the details of adjustment member 6, the previously-mentioned projecting rib 65 being visible in FIG. 5a, as is the inclination of bottom surface 62. The precise inclination of this surface is selected in dependence on the range of blades on which the particular model of the tool is to be employed, a slope of between 5° and 15° having been found suitable for a wide range of the inserted-tooth circular saw blades commonly utilized in commercial saw mills.

Embodiments of the present invention could equally be provided for swaging solid-tooth circular saws or bandsaws, with the same attendant improvements over prior art swaging techniques.

It is even conceivable that the novel tool according to the invention could be satisfactorily employed to swage saw teeth by means of manually generated impacts, i.e. by striking the rear end of rod 41 with a hammer. However, in order to fully realize the advantages of the invention, it is preferable to employ the novel tool in conjunction with a power impacting device since this enables the swaging operation to proceed much more rapidly, the guidance afforded by adjustment member 6 making a procedure of this type possible.

It will be understood that the above description of the present invention is susceptible to various modification, changes and adaptations, and the same are intended to be comprehended within the meaning and range of equivalents of the appended claims.

What is claimed is:

1. A tool for swaging saw teeth comprising, in combination: means defining a recess for receiving the tip of a saw tooth and shaped to the desired final configuration of that tooth, said means being made of a hardened material; tool guide means adjustable in position, and fixable in any selected position, relative to said recess-defining means and arranged to cooperate with a portion of the associated saw for establishing a selected orientation between said recess-defining means and the tooth to be swaged, said tool guide means comprising two longitudinally extending, parallel flanges spaced apart by a distance substantially equal to the thickness of such saw portion and arranged to receive such saw portion when a saw tooth is inserted in the recess, in order to prevent twisting of said tool about its longitudinal axis, and tilting of said tool perpendicular to the planes of said flanges, during swaging, said tool guide means further presenting a bottom surface extending between said flanges and arranged to bear against a peripheral edge of such saw portion when said tool is in position to perform a swaging operation; and impact force delivery means rigidly connected to said recess-defining means for delivering to said recess-defining means impact forces in the direction toward a tooth inserted in the recess.

2. An arrangement as defined in claim 1 wherein said recess defining means give the recess the form of a wedge composed of two opposed slanting sides that slope toward one another to meet at a line corresponding to the cutting edge of a saw tooth and two lateral sides extending parallel to one another and each extending between said slanting sides, with the distance between said lateral sides being substantially equal to the length of the cutting edge of such saw tooth when it has its desired final configuration.

3. An arrangement as defined in claim 2 wherein said recess defining means comprises four components detachably secured together and each defining a respective one of said recess sides.

4. An arrangement as defined in claim 1 wherein said tool guide means are adjustable in position longitudinally of said tool and said bottom surface is inclined to the longitudinal dimension of said tool such that longitudinal adjustment of said tool guide means results in adjustment of the orientation of said tool relative to a tooth inserted in the recess.

5. An arrangement as defined in claim 1 wherein said tool is arranged to be connected to a power device for generating the impact forces.

6. An arrangement as defined in claim 5 wherein the power device is an air hammer.

7. An arrangement as defined in claim 2 in combination with an impact force generating device connected to said force delivery means.

8. An arrangement as defined in claim 7 wherein said device is an air hammer.

* * * * *